G. B. LAMBERT.
VEHICLE WHEEL.
APPLICATION FILED APR. 3, 1911.
1,022,369.
Patented Apr. 2, 1912.
2 SHEETS—SHEET 1.
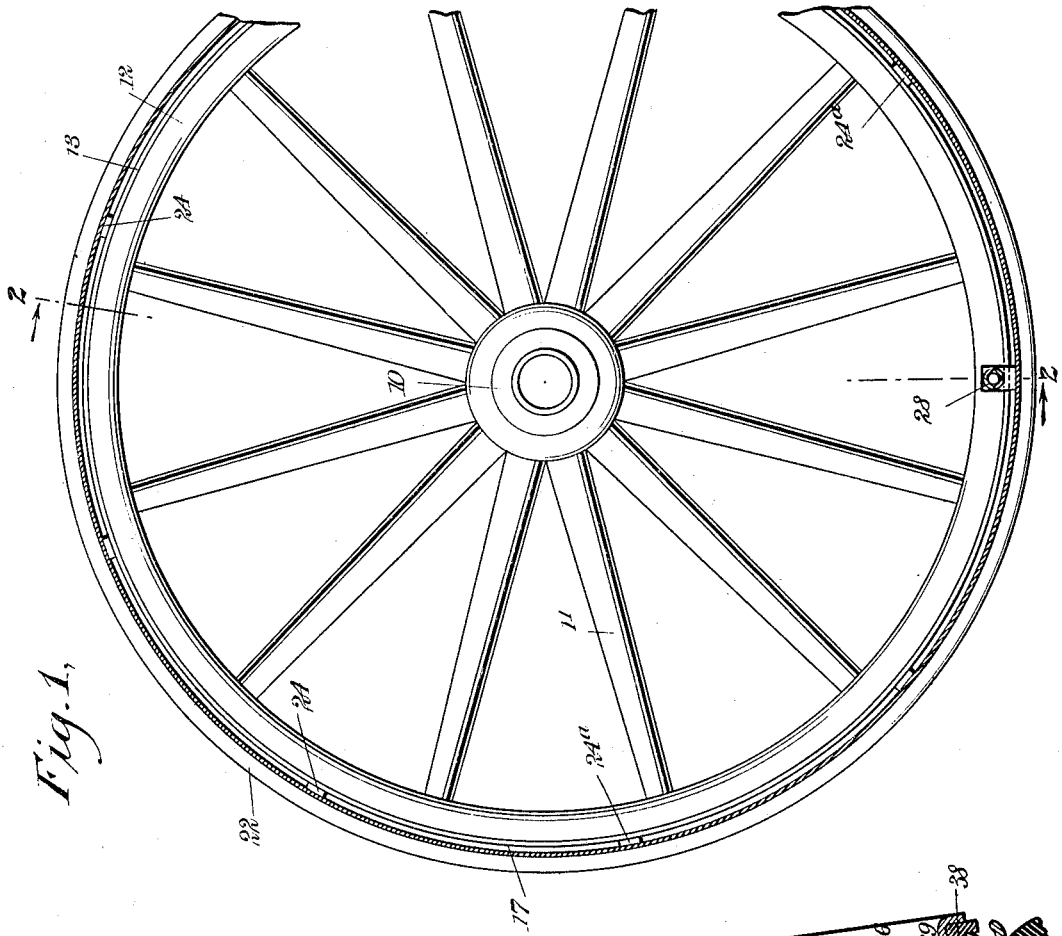
Fig. 1.
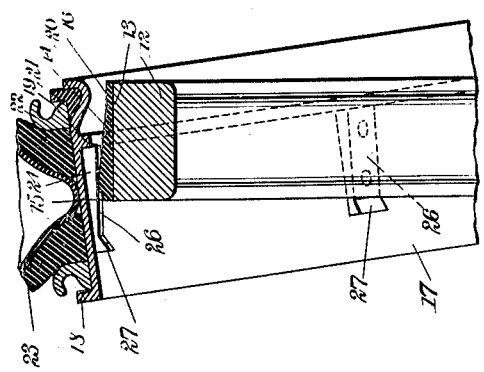
Fig. 2.
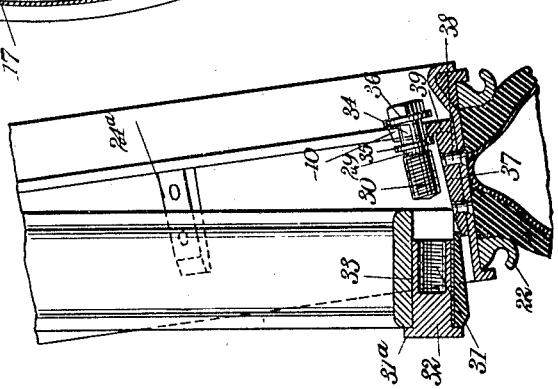
WITNESSES:
Edw. Thorpe
John K. Blackwell
INVENTOR
Gerard B. Lambert
BY Munn & Co
ATTORNEYS G. B. LAMBERT.
VEHICLE WHEEL.
APPLICATION FILED APR. 3, 1911.
1,022,369.
Patented Apr. 2, 1912.
2 SHEETS—SHEET 2.
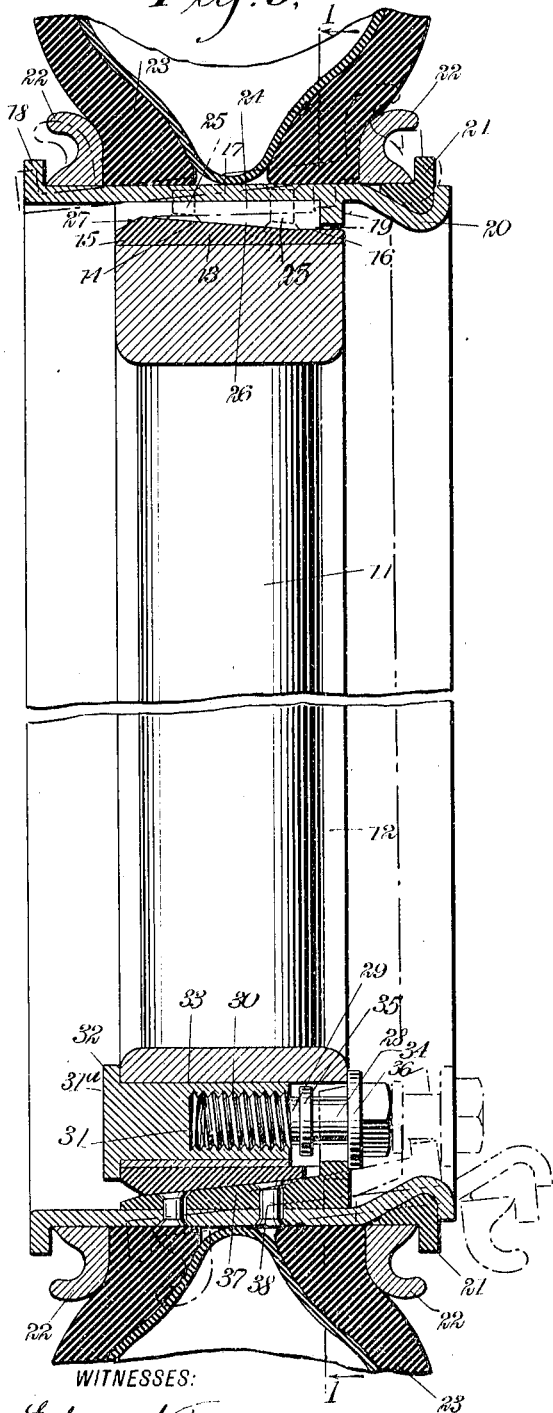
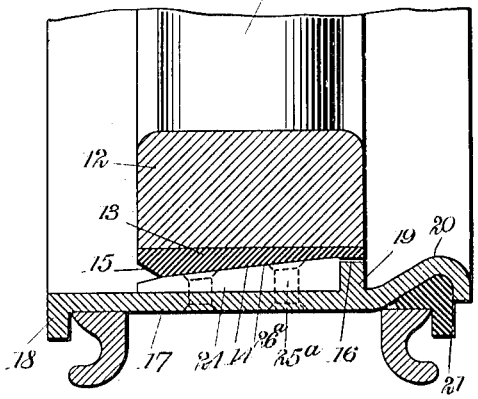
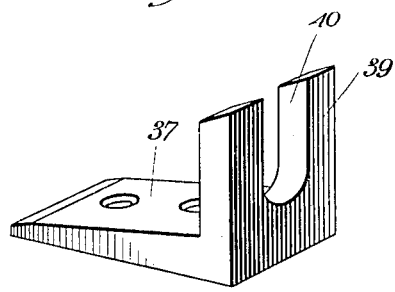
INVENTOR
Gerard B. Lambert
BY
ATTORNEYS

UNITED STATES PATENT OFFICE.

GERARD B. LAMBERT, OF NEW YORK, N. Y.

VEHICLE-WHEEL.

1,022,369.      Specification of Letters Patent.      Patented Apr. 2, 1912.

Application filed April 3, 1911. Serial No. 618,533.

*To all whom it may concern:*

Be it known that I, GERARD B. LAMBERT, a citizen of the United States, and a resident of the city of New York, borough of Manhattan, in the county and State of New York, have invented a new and Improved Vehicle-Wheel, of which the following is a full, clear, and exact description.

This invention relates to vehicle wheels for use with pneumatic and other tires, and has reference more particularly to the combination of a wheel proper, a removable tire-carrying rim mounted thereon and fulcruming at two points of the circumference of the wheel, whereby the rim can be swung in opposite directions out of the plane of the wheel, means for swinging the rim, and wedging means between the wheel and the rim.

An object of the invention is to provide a simple, strong and durable vehicle wheel with which pneumatic and other tires can be employed, which is adapted for use with automobiles and other vehicles, which is comparatively compact in form, and light in weight, which differs little in appearance from the ordinary vehicle wheel used for like purposes, and in which the removable rim carrying the tire can be easily and expeditiously removed and replaced when necessary.

A further object of the invention is to provide a vehicle wheel having a, removable tire-carrying rim, in which means are provided for releasing the rim and for locking it securely in place, the operation of the above-mentioned means insuring the secure seating of the rim upon the felly, and also insuring the easy removal of the rim so that the latter cannot become rusted or otherwise inadvertently fastened in place, and in which the wedging devices comprise an annular member of wedge cross-section, and a plurality of separate wedging elements to be engaged with the annular member.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a vertical section of a vehicle wheel constituting an embodiment of my invention, parts being broken away, the section being taken on the line 1—1 of Fig. 3; Fig. 2 is an enlarged, fragmentary section on the line 2—2 of Fig. 1, showing the rim being removed from the wheel; Fig. 3 is an enlarged, fragmentary, transverse section, certain of the parts being shown in different positions in broken outline; Fig. 4 is a fragmentary, transverse section showing certain of the details of construction; and Fig. 5 is a perspective view showing a further detail of construction.

Before proceeding to a more detailed explanation of my invention, it should be clearly understood that while the vehicle wheel is particularly useful in connection with the ordinary pneumatic tires usually employed, which are secured in place by means of an ordinary clencher rim or a removable rim such as illustrated for example herewith, any other tire-carrying rim, and other forms of tires which it is necessary from time to time to replace, can be advantageously employed therewith.

Like the vehicle wheel shown in my United States Patent No. 982,143, issued January 17, 1911, the present invention makes use of but a single operating member for removing and replacing the rim and for securing it in position. This operating member serves to swing the rim transversely of the wheel, the rim being fulcrumed upon two points of the wheel, or rather of the felly band, so that the rim itself swings in both directions out of the plane of the wheel, as distinguished from the device shown in the above-mentioned patent, in which the rim fulcrums upon a single point of the circumference of the wheel. In the present instance, the wedging devices between the wheels and the rim are also of different construction. Certain of the details of construction shown for example, herewith, form no part of the invention, and can be varied in accordance with individual preference and special conditions, without deviating from the essence of the invention as defined in the appended claims.

Referring more particularly to the drawings, I have shown for example, herewith, a vehicle wheel comprising the usual hub 10, the spokes 11, and the felly 12. Upon the felly is shrunk or otherwise secured, the felly band 13, which is permanently associated with the felly. The band is of double wedge cross-section, having its line of greatest thickness near one edge of the felly. The surface of the band comprises a main wedge face 14 and a smaller or secondary wedge face 15, inclined relatively to one another, and at their junctions determining the line of greatest thickness of the band. The wedge faces 14 and 15 are annular and extend all the way around the band. The latter has a surface 16, substantially parallel to the peripheral surface of the felly. The surface 16 is located at the edge remote from the surface 15 and joins the face 14.

The tire-carrying rim 17 shown for example herewith, is of the "flat base" type and has at one edge an outwardly and radially disposed flange 18, and near the other edge, but inwardly spaced therefrom, an inwardly and radially disposed flange 19. Beyond the latter, the rim has an inwardly extending depression 20 forming an annular groove adapted to receive a split spring locking ring 21 of angular cross section. Associated with the rim are the usual interchangeable tire-engaging and holding rings 22. As is shown in the drawings, they are positioned to hold in place a tire 23 of non-clencher type. By reversing the positions of the rings 22 they will be adapted for securing a clencher tire upon the rim. The one ring 22 is placed against the flange 18, which holds it in place. The other ring 22 is engaged by the retaining ring 21, which is sprung into position within the groove formed by the depression 20.

Located at the inside of the rim 17 are wedge elements 24 secured in place by means of rivets 25 or in any other suitable manner which permits their permanent association with the rim. The wedge elements are separated suitable distances apart and are of any convenient number. As shown for example herewith, they are four in number, and occupy one arc of the circumference of the wheel. These are of double wedge cross-section and have two relatively inclined surfaces 26 and 27, corresponding to the wedge faces 14 and 15 of the annular member 13, and are adapted to be engaged with the same and rest against the corresponding faces, as is clearly shown in Figs. 1 and 3. The rim is also provided on its complementary arc, with a plurality of wedge elements 24$^a$, preferably four, secured in position by means of rivets 25$^a$ or in any other suitable manner. The elements 24$^a$ are of simple wedge form, and each has one inclined face 26$^a$ adapted to be engaged with the corresponding face 14 of the annular member 13. It will be understood that before the wedge elements 24 can be disengaged from the member 13 they must move slightly radially. The elements 24$^a$ however can be slid out of engagement with the member 13, by a simple movement of the rim transversely of the wheel.

The rim-operating device 28 is similar to the corresponding element shown in my United States Patent No. 982,143 referred to *supra*. The device comprises an operating member 29 which has a threaded stem 30 located in a correspondingly threaded opening 31 of a socket 32. The latter is positioned in a transverse bore 33 of the felly, and has at the inner end a flange 31$^a$ which seats against the inside of the felly and against the felly band, where it is secured in position in any suitable manner. The operating member has at the outer end a reduced neck 34, and between the same and the threaded stem a laterally extended shoulder 35. At the end of the reduced neck, is a head 36 of angular form, which permits the operating member to be manipulated by means of a brace wrench or any other suitable implement. A wedge element 37, which has an inclined face similar to that of the elements 24$^a$, adapted to engage the corresponding inclined face 14 of the annular member 13, is secured by means of rivets 38 or in any other suitable manner. at the inside of the rim, at a part thereof adjacent to the socket 32. It has a radially disposed end 39 provided with a slot or recess 40 which receives the neck 34 of the operating member. The head of the operating member is located at the outside of the end 39, and the collar or shoulder 35 is positioned between the socket and the part 39. By turning the operating member in one direction or the other the rim will be swung transversely of the wheel, pivoting at two separated points of the circumference of the wheel. The portion of the rim remote from the operating member swings inwardly, and that part of the rim which carries the operating member swings outwardly as is shown in Fig. 2. It will be understood that as the operating member swings the rim out of the plane of the wheel, it will at the same time move the rim slightly across the wheel, to permit the wedge elements 24 to clear the annular element 13. Conversely, when the member 29 is operated to seat the rim, the wedge elements will ride into position relative to the annular element 13, and when the rim is arranged circumferentially about the wheel it cannot be displaced therefrom except through the agency of the operating member.

Having thus described my invention, I claim as new, and desire to secure by Letters Patent:

1. In combination, a wheel, a removable tire-carrying rim associated therewith, means for swinging said rim transversely of said wheel and wedging means between said rim and said wheel, said wedging means comprising a continuous annular wedge member having double wedge faces, a wedge element having double wedge faces and adapted to engage said first member, and a wedge element having a single wedge face and adapted to engage said first member.

2. In combination, a wheel, a removable tire-carrying rim associated therewith, a felly band mounted upon said wheel and having relatively inclined wedge faces, a plurality of spaced, double wedge elements mounted upon said rim and occupying one arc thereof and adapted to engage said felly band, a plurality of wedge elements carried by said rim and occupying a complementary arc thereof and having single wedge faces and adapted to engage said felly band, and an operating member for moving said rim transversely of said wheel, whereby said rim can fulcrum upon said band at two points thereof.

3. In combination, a wheel, a removable tire-carrying rim associated therewith, a felly band mounted upon said wheel and having adjacent, oppositely inclined wedge faces, a plurality of spaced, double wedge elements mounted upon said rim and occupying one arc thereof and adapted to engage said felly band at both of said wedge faces thereof, a plurality of wedge elements carried by said rim and occupying a complementary arc thereof and having single wedge faces adapted to engage one of said wedge faces of said band, and an operating member for moving said rim transversely of said wheel.

In testimony whereof I have signed my name to this specification in the presence of two subscribing witnesses.

GERARD B. LAMBERT.

Witnesses:
BERT J. CULL,
W. C. SKINNER.